United States Patent
Grathwol

(10) Patent No.: US 10,214,364 B2
(45) Date of Patent: Feb. 26, 2019

(54) SYSTEM FOR TRACKING OPERATING TIME FOR CONVEYOR OF WORKING MACHINE

(71) Applicant: Roadtec, Inc., Chattanooga, TN (US)

(72) Inventor: Kyle E. Grathwol, Sandusky, OH (US)

(73) Assignee: Roadtec, Inc., Chattanooga, TN (US)

( * ) Notice: Subject to any disclaimer, the term of this patent is extended or adjusted under 35 U.S.C. 154(b) by 0 days.

(21) Appl. No.: 15/950,753

(22) Filed: Apr. 11, 2018

(65) Prior Publication Data

US 2018/0297788 A1 Oct. 18, 2018

Related U.S. Application Data

(60) Provisional application No. 62/484,568, filed on Apr. 12, 2017.

(51) Int. Cl.
*E01C 19/20* (2006.01)
*B65G 43/10* (2006.01)
(Continued)

(52) U.S. Cl.
CPC .............. *B65G 43/10* (2013.01); *B65G 43/08* (2013.01); *E01C 19/08* (2013.01);
(Continued)

(58) Field of Classification Search
CPC ......... B65G 41/00; E01C 19/12; E01C 19/20; E01C 2019/2055; E01C 2301/02
(Continued)

(56) References Cited

U.S. PATENT DOCUMENTS

| 7,293,465 B2 * | 11/2007 | Nassar | B65G 43/00 |
| | | | 73/774 |
| 7,766,157 B2 * | 8/2010 | Nishikita | B65G 43/02 |
| | | | 198/810.02 |

(Continued)

FOREIGN PATENT DOCUMENTS

| CN | 105858125 A | 8/2016 |
| SU | 1497132 A1 | 7/1989 |
| SU | 1710463 A1 | 2/1992 |

OTHER PUBLICATIONS

International Search Report and Written Opinion of counterpart PCT Application No. PCT/US2018/027147 dated Jun. 28, 2018.

*Primary Examiner* — Gary S Hartmann
(74) *Attorney, Agent, or Firm* — Chambliss, Bahner & Stophel, P.C.

(57) ABSTRACT

A working machine for conducting a roadworking operation includes a conveyor that is adapted to move roadworking material as a part of the roadworking operation. The working machine also includes a sensor which is adapted to determine if a condition exists that is indicative of the conveyor's operating under a load, and a controller which includes at least one timer. The controller is adapted to receive input information including a predetermined operating run-time for a wear part that is associated with the conveyor. The controller is also adapted to receive a signal from the sensor that a condition exists which is indicative of the conveyor's operating under load. The timer of the controller is adapted to use the signal received from the sensor to measure a period of time during which the conveyor is operating under load, and the controller is adapted to compare the measured period of time that the conveyor is operating under load with the predetermined operating run-time for the wear part. If the measured time matches the predetermined operating run-time, the controller will signal the operator that the wear (Continued)

part should be inspected for possible replacement, or should be replaced.

11 Claims, 13 Drawing Sheets

(51) Int. Cl.
    *B65G 43/08*           (2006.01)
    *E01C 19/08*           (2006.01)
    *G07C 3/00*            (2006.01)
    *G05B 19/042*         (2006.01)

(52) U.S. Cl.
    CPC ............ *E01C 19/2045* (2013.01); *G07C 3/00* (2013.01); *E01C 19/20* (2013.01); *G05B 19/0421* (2013.01); *G05B 19/0428* (2013.01)

(58) Field of Classification Search
    USPC ..................... 404/83, 84.05, 84.1; 198/301
    See application file for complete search history.

(56) References Cited

U.S. PATENT DOCUMENTS

| | | | |
|---|---|---|---|
| 9,708,779 B2 * | 7/2017 | Brown | .................... E01C 19/48 |
| 9,896,276 B2 * | 2/2018 | Brown | .................... B65G 43/02 |
| 2010/0222920 A1 | 9/2010 | Andreoli | |
| 2016/0176650 A1 | 6/2016 | Brown | |
| 2018/0174114 A1 | 6/2018 | Neyens et al. | |

* cited by examiner

SYSTEM FOR TRACKING OPERATING TIME FOR CONVEYOR OF WORKING MACHINE

CROSS-REFERENCE TO RELATED APPLICATION

This application claims the benefit of U.S. Provisional Patent Application No. 62/484,568 which was filed on Apr. 12, 2017.

FIELD OF THE INVENTION

This invention relates generally to a system for tracking the operating time for a conveyor that is part of a working machine which is used to process hot mix or cold mix asphalt paving materials and/or milled material obtained from asphalt or concrete pavement. A preferred embodiment of the invention relates to such a system for tracking the operating time of a conveyor on such a working machine while the conveyor is being used to move asphalt paving material or milled material in order to timely notify an operator and/or owner of the working machine that certain wear parts of the conveyor may be nearing the end of their useful life.

BACKGROUND OF THE INVENTION

Roadwork is typically carried out by working machines that carry one or more working components and travel along a roadway. One such working machine is a milling machine, a wheeled or track-driven vehicle that is provided with a rotating working drum that includes a plurality of cutting teeth. The working drum is mounted in a housing on the frame of the machine and is adapted to be lowered into contact with the road surface and rotated about a generally horizontal axis so as to cut into the surface to a desired depth as the machine is advanced along the roadway. A milling machine includes a conveyor system typically comprising a conveyor that is designed to carry the milled material which has been cut from the roadway by the rotating drum to a location in front of, to the rear of, or beside the machine for deposit into a truck for removal from the milling site. Steerable track or wheel drive assemblies are provided to drive the working machine and to steer it in a desired working direction. Power for driving the milling machine and for operating all of its systems is typically provided by a diesel engine. Milled material cut from a roadway is quite abrasive, and its transport by the milling machine conveyor system abrades various wear components such as wear liners and the conveyor belting of the conveyor system. Other wear components such as chains, bearings, sprockets and idlers are worn by being subjected to loading during operation of the conveyor to move material during a period of time. These wear components must be inspected from time to time during the operating life of the milling machine and replaced when necessary. However, since the milling machine is a self-propelled vehicle that is driven to and from the milling site, and since the conveyor system is only operated while the milling drum is rotating, the operating time of the conveyor system under load is independent of the operating time of the drive engine.

When it is desired to pave a new roadway with asphalt paving materials, or when a milling operation has been completed in a roadway repair process, paving over the road base or milled roadway with asphalt paving material is generally carried out by another working machine, an asphalt paving machine. Asphalt paving material is comprised of an asphaltic binder and aggregates of various particle sizes, including both coarse and fine aggregate materials. Because the equipment needed to produce hot asphalt paving material, also called hot mix asphalt or "HMA", is expensive and the space required extensive, HMA is typically produced in a production facility that is dedicated to such purpose. Consequently, it is frequently necessary to transport the HMA from its place of origin to an asphalt paving machine at a remote paving site. The HMA, at a temperature of up to 350° F., is transported in dump trucks to an asphalt paving machine or to another working machine, a material transfer vehicle that completes the transfer to the asphalt paving machine.

An asphalt paving machine is self-propelled and is driven by a wheeled or track drive system. In a common type of paving machine, an asphalt receiving hopper is located at the front end of the machine to receive asphalt paving material from a truck or material transfer vehicle, and a slat-type hopper conveyor located below the asphalt receiving hopper transfers the asphalt paving material from the hopper to a distribution assembly comprising a transverse distributing auger that is mounted at the rear of the machine. The asphalt paving material is deposited onto and across the roadway or other surface to be paved by the distributing auger, and a floating screed located behind the distributing auger compacts the asphalt paving material to form an asphalt mat. Asphalt paving material is hot and abrasive, and its transport by the paving machine conveyor system wears various components of the conveyor system, such as conveyor slats, side liners and floor liners, as well as the augers of the distribution assembly, during a paving operation. Other wear components of the conveyor system, such as chains, bearings, sprockets and idlers, are worn by being subjected to loading during operation of the conveyor to move asphalt paving material during a period of time. These wear components must be inspected from time to time during the operating life of the paving machine and replaced when necessary.

Sometimes, HMA is discharged directly from a delivery truck into the asphalt receiving hopper of the asphalt paving machine. When asphalt paving material is delivered to the paving machine in this manner, a series of delivery trucks must move into contact with the front end of the paving machine to serially discharge their loads into the paving machine hopper. This method of delivery requires multiple truck maneuvers that are often difficult to achieve without stopping the paving machine. However, when a paving machine stops and subsequently restarts, its floating screed will produce a dip in the asphalt mat (when the machine stops) and a bump (when it restarts). Consequently, a type of material transfer vehicle may be used to shuttle HMA between the delivery trucks and the asphalt paving machine. Yet another type of material transfer vehicle is adapted to move alongside the asphalt paving machine while being tethered to a delivery truck to allow for the transfer of asphalt paving material from a delivery truck to an asphalt paving machine without requiring either the delivery truck or the material transfer vehicle to make direct contact with the asphalt paving machine, thus reducing the time required for delivery truck maneuvers and reducing the risk that the paving machine will have to stop during the paving operation.

A self-propelled material transfer vehicle typically includes a large-capacity truck-receiving hopper and an inclined truck-unloading conveyor extending upwardly from this hopper. A transversely oriented auger is typically provided in the truck-receiving hopper to urge HMA onto the truck-unloading conveyor. This HMA is carried upwardly by the truck-unloading conveyor from the truck-receiving hopper and discharged off the elevated output end of the truck-unloading conveyor into a chute mounted on the lower end of a paver-loading conveyor (in a non-contact type of material transfer vehicle), or into an intermediate surge bin that is sized to hold the entire load of a delivery truck (in the type of material transfer vehicle that shuttles asphalt paving material from a pick-up point to a remote paving site). The discharge of HMA off the elevated output end of the truck-unloading conveyor so that it may fall under the influence of gravity into a chute or surge bin assists in preventing undesirable segregation of the various particulate components of the asphalt paving material by particle size.

Material transfer vehicles of the type that are equipped with a surge bin typically include an auger and a conveyor in the surge bin that are adapted to transfer the HMA to the paver-loading conveyor. Paver-loading conveyors mounted on material transfer vehicles with and without surge bins are generally pivotable about an essentially vertical axis so that the material transfer vehicle can be positioned alongside an asphalt paving machine that is laying an asphalt mat and rapidly discharge HMA into the hopper of the paving machine as the material transfer vehicle moves with the paving machine along the roadway. Because of its rapid loading and unloading capabilities, the type of material transfer vehicle that rapidly shuttles between delivery trucks at a pick-up point and an asphalt paving machine that is laying an asphalt mat at a paving site reduces the likelihood that the paving machine will have to stop paving because of a lack of asphalt paving material.

Because the conveyors of a material transfer vehicle do not have be operated simultaneously, and because a significant part of the engine operating time is devoted to moving the unloaded material transfer vehicle to a paving site, or to an asphalt paving material pick-up point from a paving site, it is difficult to predict from accumulated engine runtime when conveyor wear parts may need to be replaced. Furthermore, for a material transfer vehicle that is equipped with a surge bin, i.e., a three-conveyor machine, the truck-unloading conveyor and its associated auger can operate independently of the surge bin conveyor and the paver-loading conveyor. In addition, the paver-loading conveyor can operate independently of the truck-unloading conveyor or the surge bin conveyor; however, the paver-loading conveyor has to be "on" for the surge bin conveyor to operate. For a material transfer vehicle that is not equipped with a surge bin, i.e., a two-conveyor machine, the paver-loading conveyor can operate independently of the truck-unloading conveyor, but the paver-loading conveyor has to be "on" for the truck-unloading conveyor to operate.

As has been mentioned, asphalt paving materials are quite abrasive, and may be delivered to a material transfer vehicle at temperatures of up to 350° F. Consequently, several of the components of the conveyor system, such as conveyor slats, side liners and floor liners, are intended to be replaced as necessary due to frictional forces generated by the hot mix asphalt paving material. Other components of the conveyor system of a material transfer vehicle will also need to be replaced from time to time, including conveyor chains, sprockets, idlers and bearings associated with the conveyors. In addition, the augers in the truck-receiving hopper and the surge bin also wear out over time and may need to be replaced.

Cold in-place recycling ("CIR") equipment can be used to repair damage to a roadway in a single pass, while reusing essentially all of the existing asphalt pavement in the damaged areas. In the CIR process, damaged layers of asphalt pavement are removed. The removed material is processed and replaced on the roadway and then compacted. If a roadway has good structural strength, a CIR process can be effective for treating all types of cracking, ruts and holes in asphalt pavement. CIR can be used to repair asphalt roadways damaged by fatigue (alligator) cracking, bleeding (of excess asphalt cement), block cracking, corrugation and shoving, joint reflective cracking, longitudinal cracking, patching, polished aggregate, potholes, raveling, rutting, slippage cracking, stripping and transverse (thermal) cracking. The root cause of the pavement failure should always be investigated to rule out base failure. However, CIR can almost always be used when there is no damage to the base of the roadway. Generally, CIR is only half as expensive as paving with HMA, while providing approximately 80% of the strength of hot mix paving.

CIR can be carried out with the aid of a milling machine that has been modified by mounting a spray assembly in the milling drum housing to inject asphalt cement into the milling drum housing. The asphalt cement is then thoroughly blended with the milled material by the milling drum and can be left in a windrow or fed by the milling machine's discharge conveyor directly into an asphalt paving machine. When the CIR process is carried out with only a milling machine and an asphalt paving machine, the asphalt cement component of the cold mix asphalt ("CMA") must be supplied from a separate supply tank truck that is coupled to the modified milling machine. The asphalt cement component is drawn directly from the tank on the supply truck and metered through a flow system that is mounted on the milling machine to the spray assembly in the milling drum housing. The operation of the conveyor system of a modified milling machine to transport milled material and CMA comprising the recycled asphalt paving material mixed with asphalt cement abrades various wear components such as wear liners and belting of the conveyor system. Other wear components such as chains, bearings, sprockets and idlers are worn by being subjected to loading over a period of time. These wear components must be inspected from time to time during the operating life of the modified milling machine and replaced when necessary.

Sometimes the CIR process is carried out with a milling machine in train with a cold recycler machine such as the RT-500 that is made and sold by Roadtec, Inc. of Chattanooga, Tenn. The cold recycler machine may include a vibratory screen, a crusher, an onboard source of asphalt cement and a pugmill mixer, along with various conveyors. When the CIR process is carried out using a cold recycler machine, the recycled asphalt material that is milled by the milling machine is transferred to the vibratory screen and then to the crusher on the cold recycler machine, and the screened and crushed material is then mixed with asphalt cement that is dispensed by a spray assembly from an onboard supply tank into the pugmill to produce CMA. The CMA that is produced by this process can be left in a windrow on the roadway or fed by the cold recycler machine's discharge conveyor directly into an asphalt paving machine. The operation of the conveyor system of a cold recycler machine to transport milled material and CMA comprising the recycled asphalt paving material mixed with asphalt cement abrades various wear components such as wear liners and belting of the conveyor system. Other wear components such as chains, bearings, sprockets and idlers are worn by being subjected to loading over a period of time.

These wear components must be inspected from time to time during the operating life of the cold recycler machine and replaced when necessary.

It would be desirable if a system could be developed that could accurately measure the time that each conveyor of a working machine is used to carry asphalt paving material or milled material and to provide notice when certain wear parts, including conveyor belting, chains and slats, conveyor floor liners and side liners, sprockets, idlers, bearings and augers should be replaced or inspected for possible replacement.

Advantages of the Invention

Among the advantages of the invention is that it provides a system that measures the time that each conveyor is used to carry asphalt paving material or milled material. Another advantage of a preferred embodiment of the invention is that it provides such a system that can be used to timely notify an operator and/or owner of the working machine that certain wear parts of the conveyor may be nearing the end of their useful life. Other advantages and features of this invention will become apparent from an examination of the drawings and the ensuing description.

Notes on Construction

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "attached", "connected" and "interconnected", refer to a relationship wherein structures are secured or attached to one another either directly or indirectly through intervening structures, as well as both moveable and rigid attachments or relationships. The terms "operatively attached" and "operatively connected" describe such an attachment, coupling or connection that allows the pertinent structures to operate as intended by virtue of that relationship. The term "fluid communication" is such an attachment, coupling or connection that allows for flow of fluid from one such structure or component to or by means of the other.

The use of any and all examples or exemplary language (e.g., "such as" and "preferably") herein is intended merely to better illuminate the invention and the preferred embodiments thereof, and not to place a limitation on the scope of the invention. Nothing in the specification should be construed as indicating any element as essential to the practice of the invention unless so stated with specificity.

Several terms are specifically defined herein. These terms are to be given their broadest reasonable construction consistent with such definitions, as follows:

The term "milled material" and similar terms refer to Portland cement concrete material and asphalt pavement material that has been removed from a roadway by a milling machine.

The term "asphalt cement" refers to a bituminous fluid that is used in combination with aggregate materials in the production of asphalt paving material. The term "asphalt cement" includes asphalt emulsions which are chemically stabilized dispersions of asphalt cement in water.

The term "asphalt paving material" refers to a bituminous paving mixture that is comprised of asphalt cement and crushed stone, recycled asphalt shingles, milled materials and/or other aggregate materials of varying particle size, and which is used for paving purposes. Asphalt paving material includes HMA, which is heated, and CMA, which is not heated.

The term "roadworking material" refers to milled material and/or asphalt paving material.

The terms "asphalt paving machine", "paving machine" and "paver" refer to a finishing machine for applying asphalt paving material to form an asphalt mat on a roadway, parking lot or similar surface. An asphalt paving machine or paver is typically a self-propelled vehicle having a hopper at one end for receiving asphalt paving material, a distributing auger at the other end and a floating screed for forming an asphalt mat. A conveyor is also provided to move asphalt paving material from the hopper to the roadway in front of the distributing auger.

The term "material transfer vehicle" refers to a vehicle that is adapted to receive asphalt paving material from a supply truck and to transfer the asphalt paving material to the hopper of an asphalt paving machine. A material transfer vehicle includes a truck-receiving hopper that is adapted to receive asphalt material from a dump-type supply truck, a truck-unloading conveyor that is adapted to receive asphalt material from the truck-receiving hopper, and a paver-loading conveyor that is adapted to discharge asphalt paving material into the hopper of an asphalt paving machine.

The term "linear actuator" refers to an electric, pneumatic, hydraulic, electro-hydraulic or mechanical device that generates force which is directed in a straight line.

The term "working machine" refers to a self-propelled road working machine that includes a conveyor for moving milled material and/or asphalt paving material in connection with a roadworking process.

The terms "above", "upper" and similar terms, when used with respect to a conveyor of a working machine or a component of such a conveyor, refer to a relative location or direction away from the surface on which the working machine is operated.

The terms "below", "lower" and similar terms, when used with respect to a conveyor of a working machine or a component of such a conveyor, refer to a relative location or direction towards the surface on which the working machine is being operated.

The term "working direction" refers to the primary direction of travel of a working machine as it operates in working on a roadway or other surface.

The term "right", when used herein to describe a relative position or direction on or in connection with a working machine, or a component thereof, refers to the right side of the machine or component from the perspective of an operator who is driving the working machine in the working direction.

The term "left", when used herein to describe a relative position or direction on or in connection with a working machine or a component thereof, refers to the left side of the machine or component from the perspective of an operator who is driving the working machine in the working direction.

SUMMARY OF THE INVENTION

The invention comprises a controller which includes at least one timer, and one or more sensors that are operatively connected to the controller. These components comprise a system that is adapted to measure the time that the conveyor of a working machine is used to carry asphalt paving material or milled material. Each sensor is adapted to send a signal to the controller when the sensor determines that a condition exists which is indicative of a conveyor operating under a load, and the timer component of the controller will measure the time that the conveyor is operating under load. A preferred embodiment of the invention comprises such a system that can be used to notify an operator and/or owner of the working machine that certain wear parts of the conveyor may be nearing the end of their useful life, so that such components can be replaced or inspected for possible replacement.

In order to facilitate an understanding of the invention, the preferred embodiments of the invention, as well as the best mode known by the inventor for carrying out the invention, are illustrated in the drawings, and a detailed description thereof follows. It is not intended, however, that the invention be limited to the particular embodiments described or to use in connection with the apparatus illustrated herein. Therefore, the scope of the invention contemplated by the inventor includes all equivalents of the subject matter described herein, as well as various modifications and alternative embodiments such as would ordinarily occur to one skilled in the art to which the invention relates. The inventor expects skilled artisans to employ such variations as seem to them appropriate, including the practice of the invention otherwise than as specifically described herein. In addition, any combination of the elements and components of the invention described herein in any possible variation is encompassed by the invention, unless otherwise indicated herein or clearly excluded by context.

BRIEF DESCRIPTION OF THE DRAWINGS

The presently preferred embodiment of the invention is illustrated in the accompanying drawings, in which like reference numerals represent like parts throughout, and wherein.

DESCRIPTION OF THE PREFERRED EMBODIMENTS OF THE INVENTION

Figure 1:
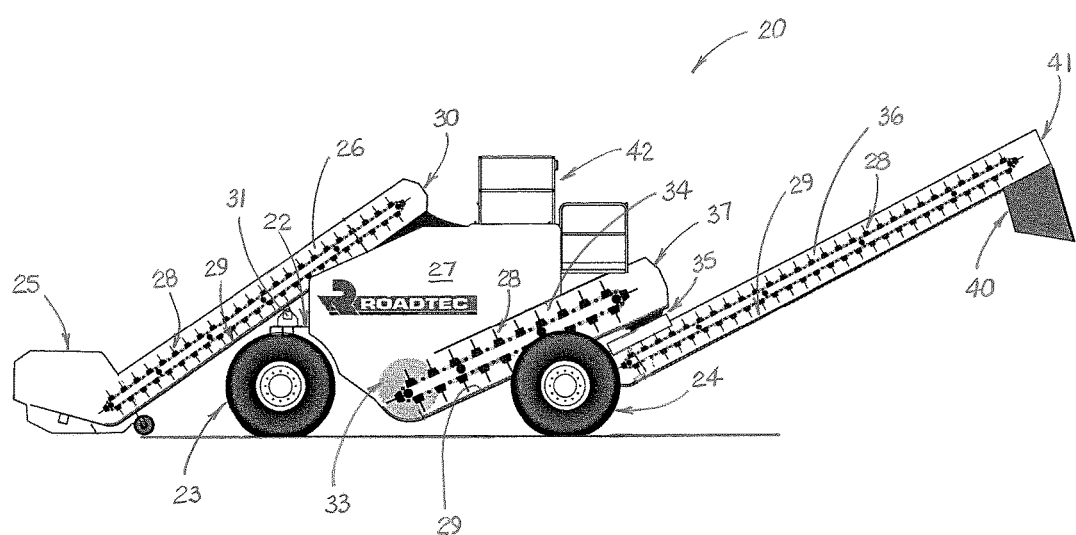
FIG. 1 is a side view of a first embodiment of a material transfer vehicle that may be equipped with the invention.

This description of the preferred embodiments of the invention is intended to be read in connection with the accompanying drawings, which are to be considered part of the entire written description of this invention. The drawing figures are not necessarily to scale, and certain features of the invention may be shown exaggerated in scale or in somewhat schematic form in the interest of clarity and conciseness.

Figure 3:
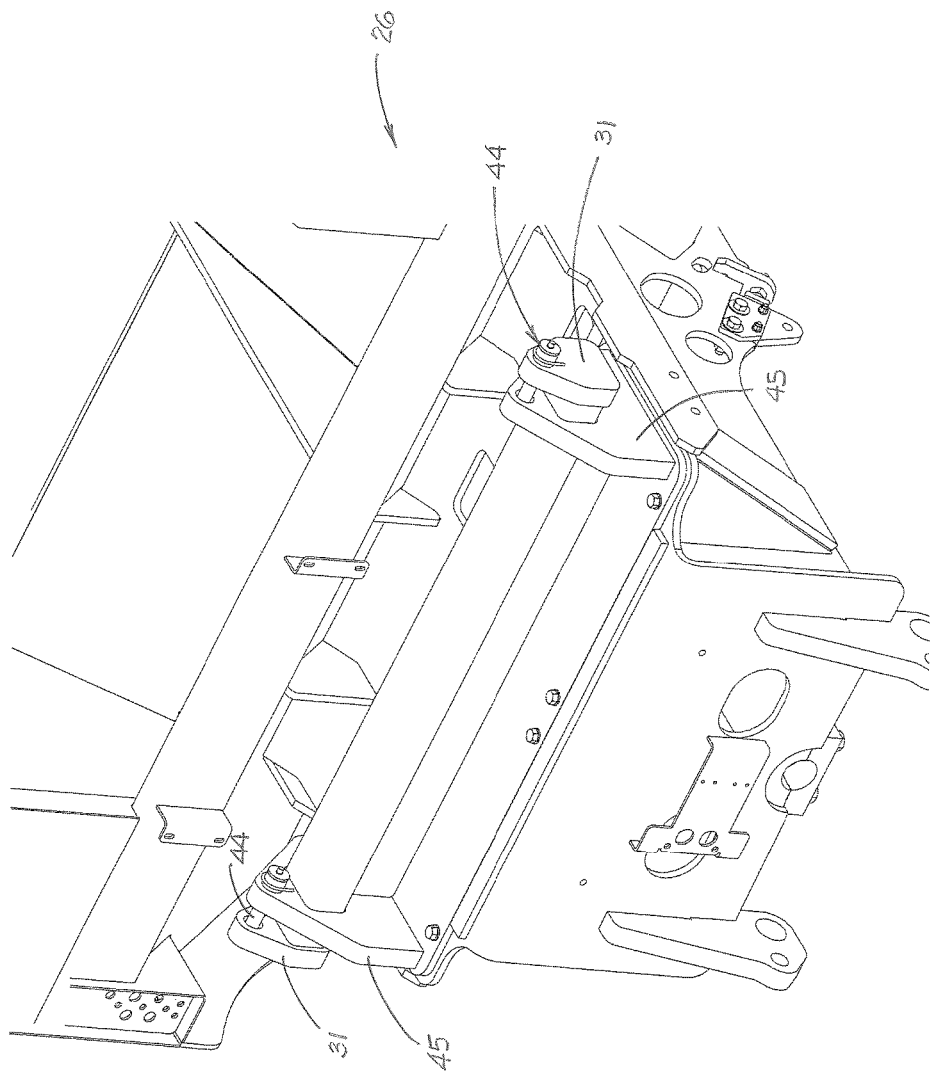
FIG. 3 is a perspective view of a portion of the truck-unloading conveyor of the material transfer vehicle illustrated in FIG. 1, showing the location of a sensor that comprises a part of a preferred embodiment of the invention.

FIG. 1 illustrates a first embodiment 20 of a material transfer vehicle that is used to transfer roadworking material comprising asphalt paving material from an asphalt material delivery truck (not shown) to an asphalt paving machine (such as asphalt paving machine 21 shown in FIGS. 4 and 5) at a remote paving site. Material transfer vehicle 20 includes frame 22 that is supported on the roadway surface by first wheel set 23 and second wheel set 24. Each of the wheel sets is driven by a hydraulic motor (not shown) that is supplied with fluid under pressure by one or more hydraulic pumps (also not shown). The wheel sets are operated to drive material transfer vehicle 20 to a pick-up point at which it can receive a load of asphalt paving material from a delivery truck. Material transfer vehicle 20 includes truck-receiving hopper 25 and truck-unloading conveyor 26 for receiving asphalt paving material from a delivery truck and for conveying it to surge bin 27. Truck-unloading conveyor 26 is preferably a chain-driven slat-type conveyor having a plurality of slats 28 that assist in conveying asphalt paving material from the truck-receiving hopper to the upper end of truck-unloading conveyor 26. Truck-unloading conveyor 26 includes a plurality of wear plates 29 located along the bottom of truck-unloading conveyor housing 30. Truck-receiving hopper 25 is adapted to be raised from the position shown in FIG. 1 to a travel position off the surface of the roadway by a linear actuator (not shown). This action will pivot truck-unloading conveyor 26 about a pair of pivot mounts 31 (also shown in FIG. 3) which are attached to frame 22 of the vehicle.

Figure 2:
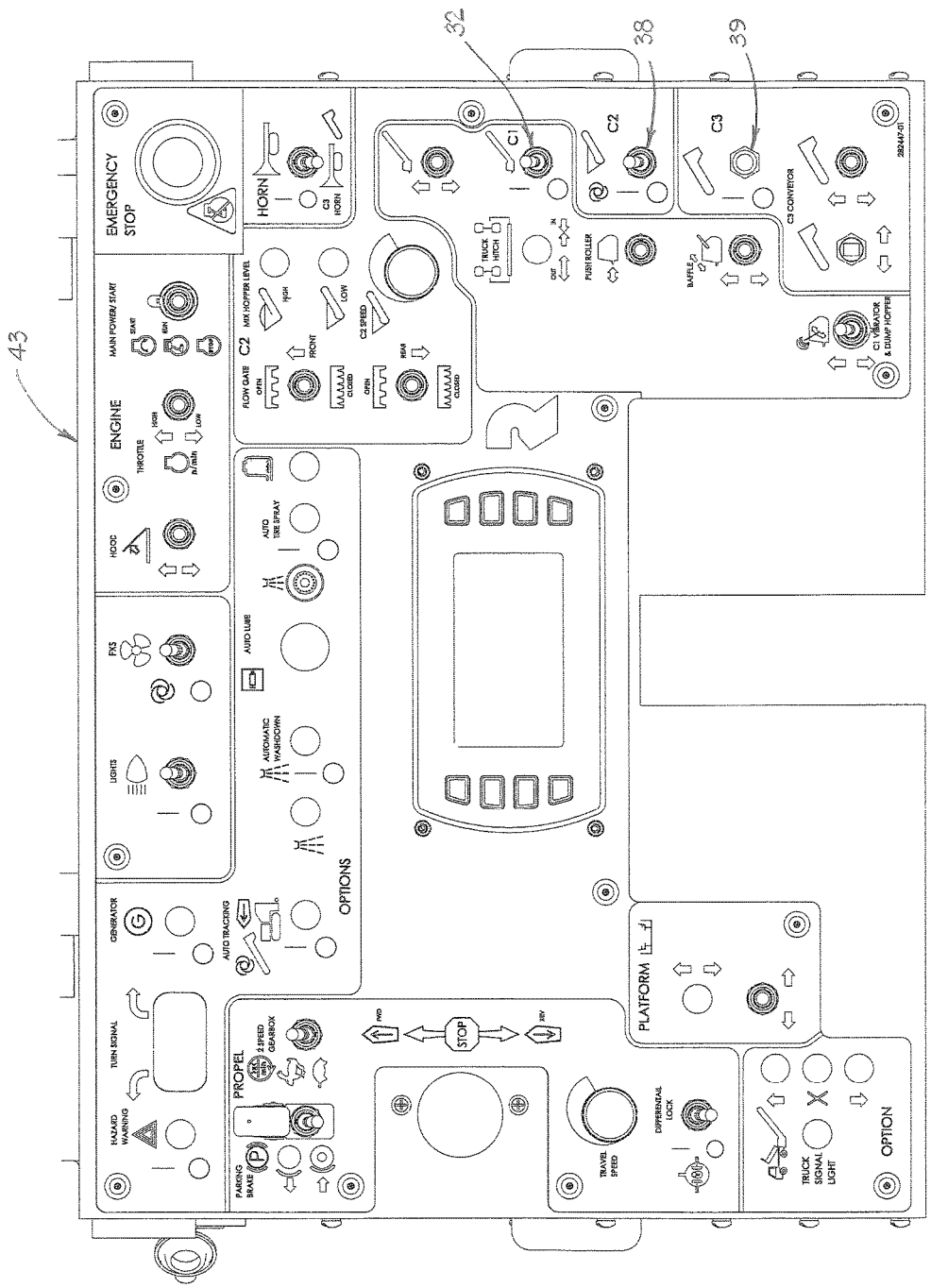
FIG. 2 is a front view of the control panel of the material transfer vehicle illustrated in FIG. 1, showing the location of certain switch sensors that comprise a part of a preferred embodiment of the invention.

A conventional asphalt paving material supply truck (not shown) is adapted to deliver asphalt paving material from an asphalt paving material production site to a convenient location remote from the paving site, so that material transfer vehicle 20 may transport the entire truck-load of asphalt paving material to a paving machine at the paving site. Thus, material transfer vehicle 20 is adapted to shuttle between HMA supply trucks at an asphalt paving material pick-up point and a paving machine that is engaged in paving a roadway some distance away from the pick-up point. At the pick-up point, material transfer vehicle 20 will maneuver so that its truck-receiving hopper 25 is adjacent to the hinged tailgate of a dump-type delivery truck. When the material transfer vehicle is in place, the delivery truck will raise its dump bed so that the asphalt paving material slides through the truck tailgate into truck-receiving hopper 25. When this is accomplished, the operator of material transfer vehicle 20 will activate truck-unloading conveyor switch 32 (shown in FIG. 2) to cause truck-unloading conveyor 26 to convey the asphalt paving material out of truck-receiving hopper 25 into surge bin 27. The surge bin includes transverse auger 33 that is employed to mix the asphalt paving material in the surge bin in order to minimize segregation or separation of the aggregate portion of the asphalt paving material by size. When the asphalt paving material has been transferred into surge bin 27, truck-unloading conveyor switch 32 will be turned "off", and truck-receiving hopper 25 will be raised off the surface of the roadway to the travel position. Transverse auger 33 will be turned "on" as the material transfer vehicle is driven to the paving site.

Also located in surge bin 27 is surge conveyor 34, which is adapted to convey asphalt paving material out of the surge bin to chute 35 which is associated with paver-loading conveyor 36. Surge conveyor 34 is preferably a chain-driven slat-type conveyor having a plurality of slats 28 (like those of truck-unloading conveyor 26) that assist in conveying asphalt paving material out of surge bin 27. Surge conveyor 34 includes a plurality of wear plates 29 located along the bottom of surge conveyor housing 37, a portion of which comprises surge bin 27. When material transfer vehicle 20 reaches the paving site and is positioned alongside paving machine 21, surge conveyor switch 38 will be activated to cause surge conveyor 34 to convey the asphalt paving material out of the surge bin to the upper output end of surge conveyor 34, where it falls through chute 35 and onto paver-loading conveyor 36. Paver-loading conveyor 36 is mounted for vertical pivotal movement about a pivot at its entry end as raised and lowered by a linear actuator (not shown). Conveyor 36 is also adapted for side-to-side movement about a vertical axis by operation of one or more additional actuators (also not shown).

Paver-loading conveyor switch 39 is tied to surge conveyor switch 38, so that when surge conveyor switch 38 is turned "on", paver-loading conveyor switch 39 will also be turned "on". When these switches are turned "on", asphalt paving material that falls through chute 35 onto paver-loading conveyor 36 will be carried upwardly and off the output end of paver-loading conveyor through chute 40 into the hopper of a paving machine such as paving machine 21. Paver-loading conveyor 36 includes a plurality of wear plates 29 located along the bottom of paver-loading conveyor housing 41. Hydraulic drive systems including hydraulic pumps and hydraulic motors that are in fluid communication with the hydraulic pumps are provided to drive transverse auger 33 and the various conveyors, and an engine (not shown) provides the motive force for the hydraulic pumps that drive the hydraulic motors for the wheel sets, the transverse auger and the various conveyors and other components of the vehicle. Vehicle 20 is operated by an operator located at operator's platform 42, which includes control panel 43 (shown in FIG. 2). Vehicle 20 also includes a controller (not shown) including at least one timer, and various sensors that comprise the invention. These sensors are operatively connected to the controller and adapted to signal the controller when a conveyor is carrying asphalt paving materials. The controller is also adapted to receive input information, such as a predetermined operating time limit for a particular wear part or component of the conveyor, that the controller compares to the measured conveyor operating time under load, so that it may notify the operator or owner of material transfer vehicle 20 when the accumulating operating time of a conveyor is such that certain conveyor wear parts, including conveyor chains and slats, conveyor floor liners and side liners, sprockets, idlers, bearings and augers, should be replaced or inspected for possible replacement. Some of these sensors will be described herein in connection with this description of material transfer vehicle 20. Others will be described in connection with descriptions of other working machines described hereinafter.

Switches 32, 38 and 39 may be operatively connected to the controller and adapted to signal to the controller when the associated conveyors are turned "on", in order that the controller may measure the run-time of each such conveyor. A pair of sensors that may be part of an embodiment of the invention are shear style load cells 44 that are mounted between truck-unloading conveyor frame side mounts 45 (shown in FIG. 3) and pivot mounts 31 which are attached to the frame of material transfer vehicle 20. These load cells are operatively connected to the controller and adapted to signal to the controller when they detect the presence of asphalt paving materials on truck-unloading conveyor 26. The controller and other sensors that may be employed in connection with the application of the invention to a working machine such as a material transfer vehicle will be discussed in more detail hereinafter in connection with the application of the invention to material transfer vehicle 110.

Figure 4:
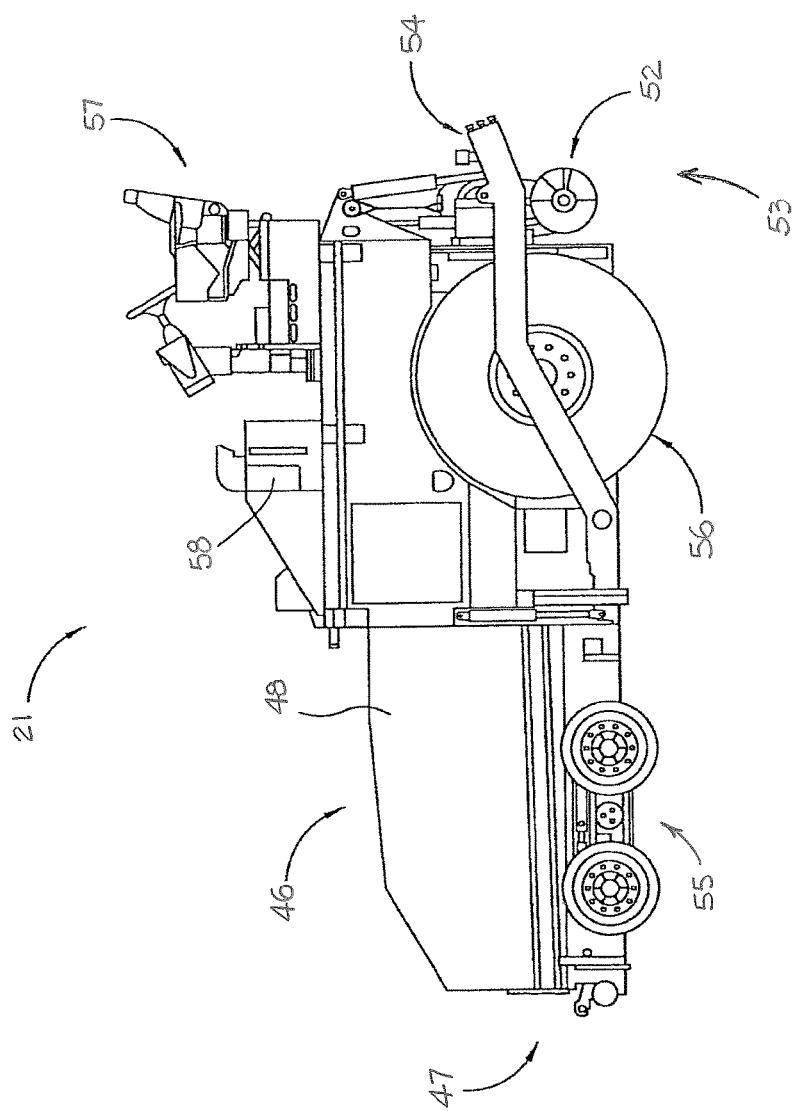
FIG. 4 is a side view of an asphalt paving machine that may be equipped with the invention.
Figure 5:
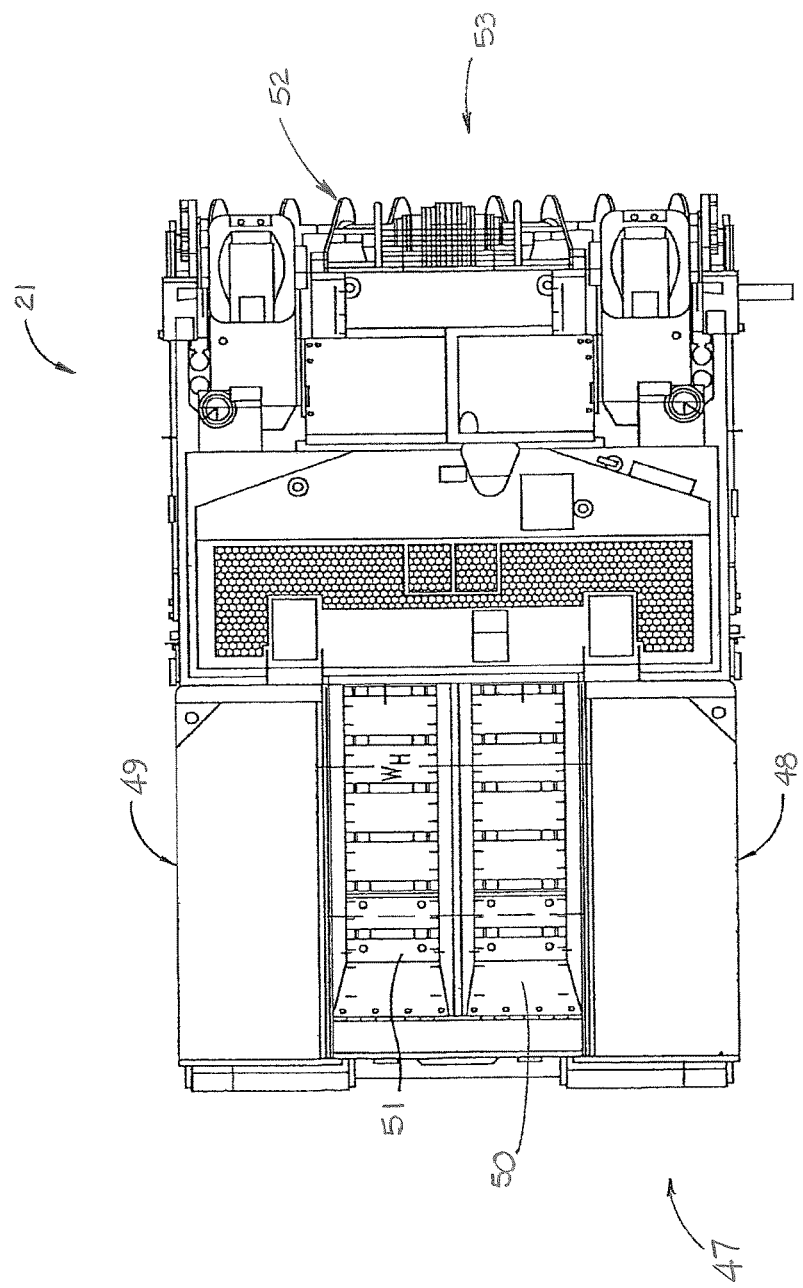
FIG. 5 is a top view of the asphalt paving machine shown in FIG. 4.

Material transfer vehicle 20 may be operated to discharge asphalt paving material into the hopper of an asphalt paving machine such as paving machine 21 shown in FIGS. 4 and 5. Paving machine 21 includes hopper 46 at its front end 47, which hopper is bounded by left sidewall 48 and right sidewall 49. A conveyor system in paving machine 21 (shown in FIG. 5) comprises left slat conveyor 50 and right slat conveyor 51 that cooperate to transport asphalt paving material from hopper 46 to the roadway in front of distributing auger assembly 52, which is located at rear end 53 of paving machine 21. A conventional vibratory floating screed (not shown) is supported by a pair of tow arms (one of which, tow arm 54 is shown in FIG. 4). This screed acts to compact the asphalt paving material into an asphalt mat. Paving machine 21 includes a pair of front wheel sets (one of which, left front wheel set 55, is shown in FIG. 4) and a pair of rear drive wheels (one of which, left rear drive wheel 56, is shown in FIG. 4). Paving machine 21 also includes hydraulic drive systems comprising hydraulic pumps and hydraulic motors that are in fluid communication with the hydraulic pumps which are provided to drive left conveyor 50, right conveyor 51, transverse distributing auger assembly 52, and the rear drive wheels. An engine (not shown) provides the motive force for the hydraulic pumps that drive the hydraulic motors for the drive wheels, the transverse distributing auger assembly and the various conveyors and other components of the paving machine. Paving machine 21 is operated by an operator located at operator's platform 57, which includes a control panel (not shown) and controller 58. Controller 58 includes at least one timer and is operatively connected to various sensors that comprise the invention. These sensors are adapted to signal to the controller when a conveyor is carrying asphalt paving materials. The controller is also adapted to receive input information, such as a predetermined operating time limit for a particular wear part or component of the conveyor, that the controller compares to the measured conveyor operating time under load, so that it may notify the operator or owner of paving machine 21 when the accumulating operating time of a conveyor is such that certain conveyor wear parts, including conveyor chains and slats, conveyor floor liners and side liners, sprockets, idlers and bearings, and other wear parts such as the auger components of distributing auger assembly 52, should be replaced or inspected for possible replacement.

Figure 6:
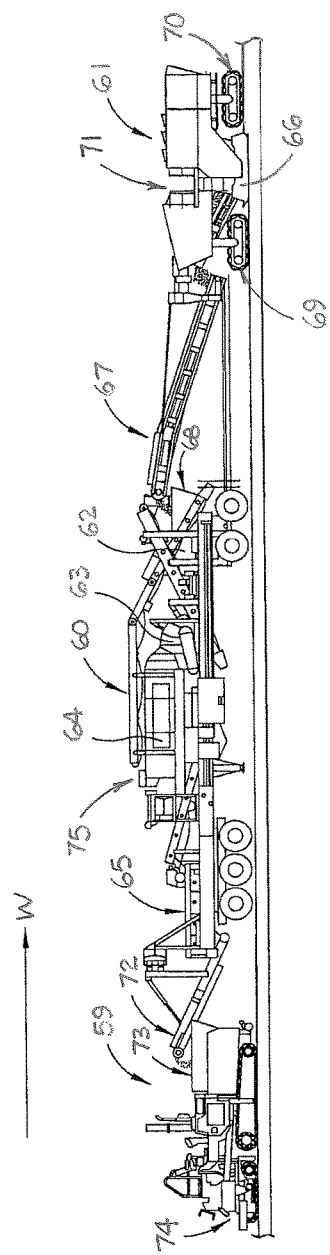
FIG. 6 is a side view of a CIR train comprising three working machines, namely an asphalt paving machine, a cold recycler machine and a milling machine, each of which may be equipped with the invention.
Figure 7:
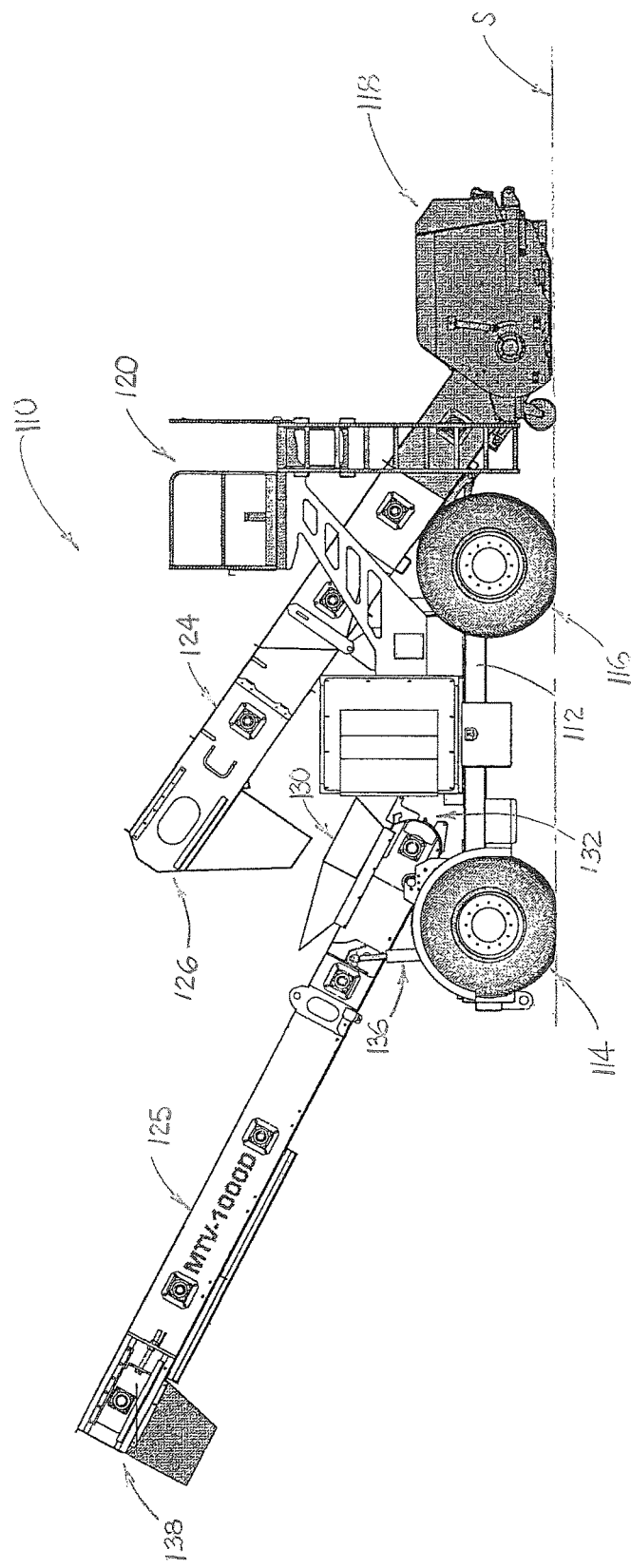
FIG. 7 is a side view of a second embodiment of a material transfer vehicle that may be equipped with the invention.
Figure 8:
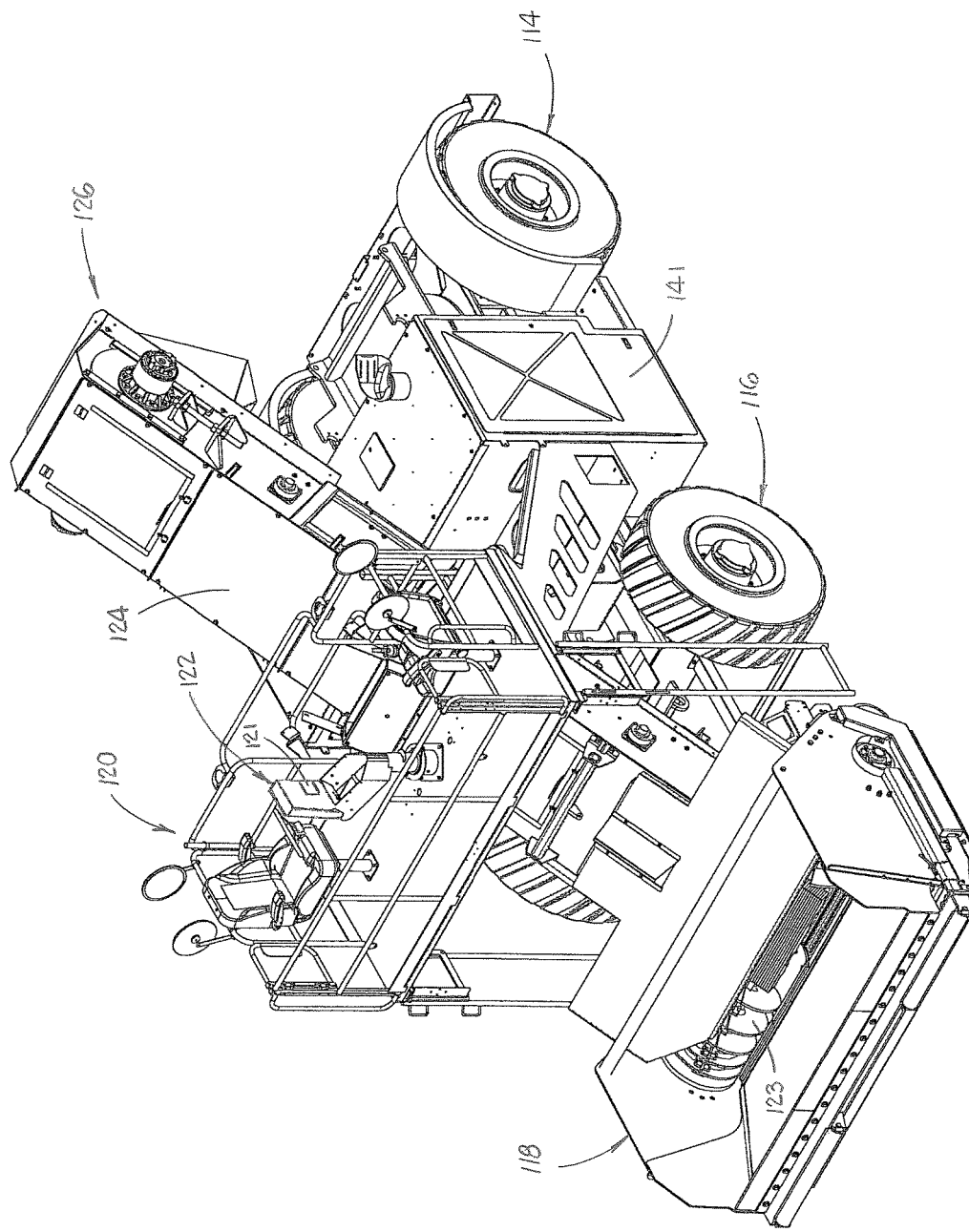
FIG. 8 is a perspective view of a portion of the material transfer vehicle illustrated in FIG. 7.
Figure 9:
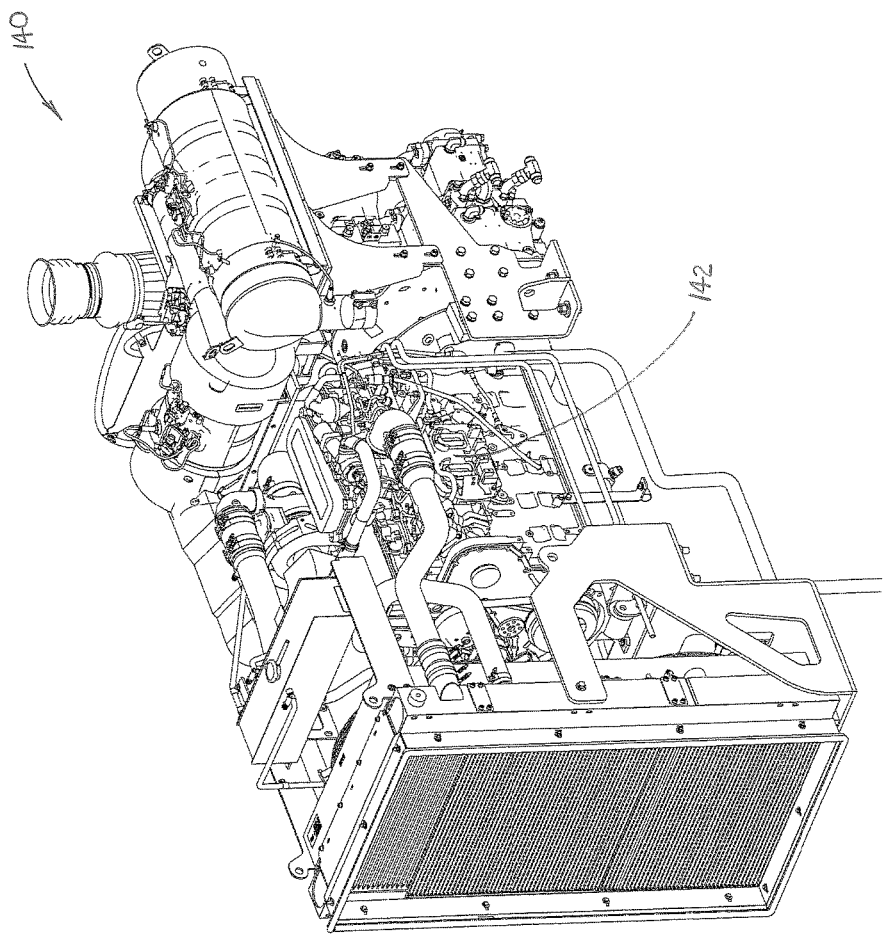
FIG. 9 is a perspective view of the engine of the material transfer vehicle illustrated in FIGS. 7 and 8, showing the location of a sensor that comprises a part of a preferred embodiment of the invention.

FIG. 6 illustrates a CIR train that is adapted to traverse the roadway in the working direction "W", recycling and repairing the asphalt pavement in a single pass. This CIR train is comprised of three working machines, asphalt paving machine 59 (which is similar in all material respects to asphalt paving machine 21), cold recycler machine 60, and milling machine 61. Cold recycler machine 60 is a self-propelled working machine that includes asphalt cement storage tank 62, crusher 63, screen assembly 64 and pugmill 65. Milling machine 61 is a conventional milling machine that is provided with a rotating working drum (not shown) that includes a plurality of cutting teeth. The drum is mounted in housing 66 on the frame of the machine and is adapted to be lowered into contact with the road surface and rotated about a generally horizontal axis so as to cut into the surface to a desired depth as the machine is advanced along the roadway. A conveyor system comprising milling conveyor 67 carries the milled material which has been cut from the roadway by the rotating drum to input hopper 68 on cold recycler machine 60. Steerable track drive assemblies, including front drive assembly 69 and rear drive assembly 70 are provided to drive the machine and to steer it in working direction "W". Power for driving the milling machine and for operating all of its systems is provided by a diesel engine (not shown). Milling machine 61 is operated by an operator located at operator's platform 71, which includes a control panel (not shown) and a controller (also not shown). This controller includes at least one timer and various sensors that comprise the invention. These sensors are operatively connected to the controller and adapted to signal to the controller when milling conveyor 67 is carrying milled material. The controller is also adapted to receive input information, such as a predetermined operating time limit for a particular wear part or component of the conveyor, that the controller compares to the measured conveyor operating time under load, so that it may notify the operator or owner of milling machine 61 when the accumulating operating time of a conveyor is such that certain conveyor wear parts, including conveyor belting and wear liners, as well as chains, sprockets, idlers and bearings should be replaced or inspected for possible replacement.

The roadworking material comprising milled material is conveyed by milling conveyor 67 to input hopper 68 on cold recycler machine 60. This milled material is then processed by cold recycler machine 60 by means of crusher 63 and screen assembly 64, and is conveyed into pugmill 65. Asphalt cement from asphalt cement storage tank 62 is also conveyed to and dispensed into pugmill 65 and mixed therein with the processed milled material. Roadworking material comprising recycled asphalt paving material mixed in the pugmill is then conveyed by conveyor 72 into hopper 73 at the front end of asphalt paving machine 59. The conveyor system in asphalt paving machine 59, which is essentially identical to that in paving machine 21, delivers the recycled asphalt paving material from hopper 73 to a position just in advance of floating screed 74 where it is discharged onto the surface to be paved. Screed 74 compacts and levels the asphalt mat on the repaired roadway. Cold recycler machine is operated by an operator located at operator's platform 75, which includes a control panel (not shown) and a controller (also not shown). This controller includes at least one timer and various sensors that comprise the invention. These sensors are operatively connected to the controller and adapted to signal to the controller when the various conveyors are carrying milled material or CMA. The controller is also adapted to receive input information, such as a predetermined operating time limit for a particular wear part or component of the conveyor, that the controller compares to the measured conveyor operating time under load, so that it may notify the operator or owner of cold recycler machine 60 when the accumulating operating time of a conveyor is such that certain conveyor wear parts, including conveyor belting and wear liners, as well as chains, sprockets, idlers and bearings should be replaced or inspected for possible replacement.

Figure 10:
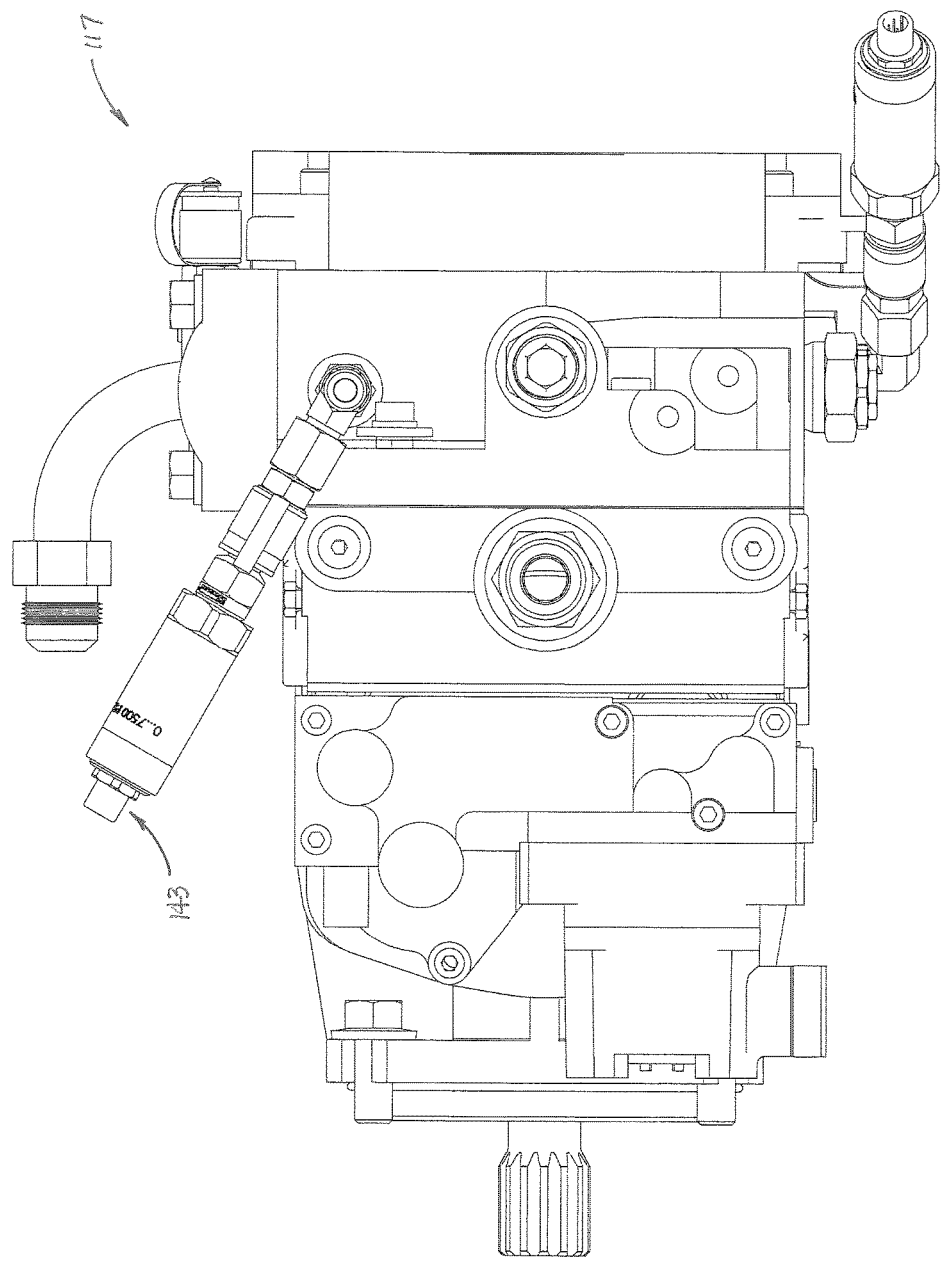
FIG. 10 is a top view of a hydraulic pump that forms a part of the hydraulic circuit of the material transfer vehicle that is illustrated in FIGS. 7 and 8, showing the location of a sensor that comprises a part of a preferred embodiment of the invention.
Figure 11:
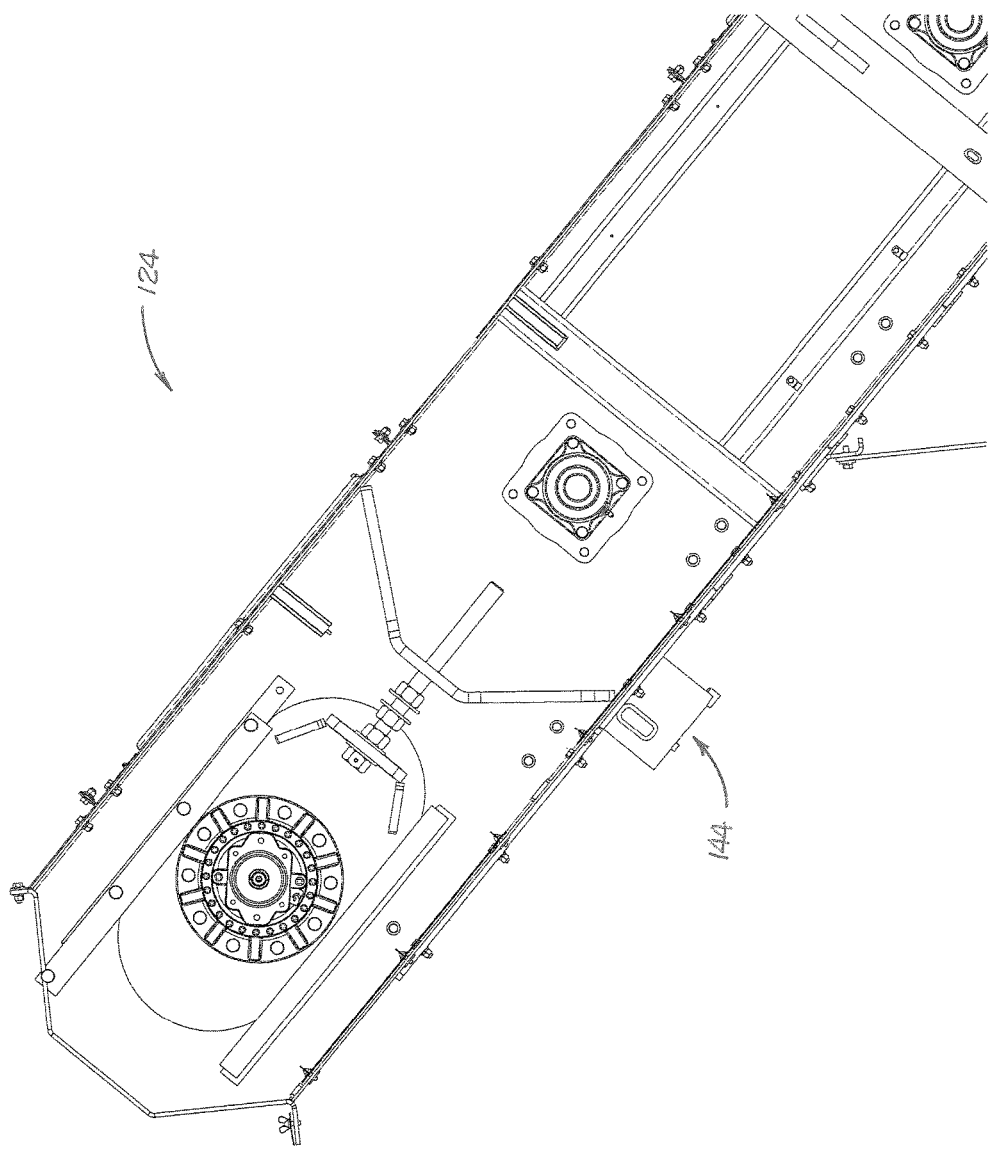
FIG. 11 is a side view of a portion of the truck-unloading conveyor of the material transfer vehicle that is illustrated in FIGS. 7 and 8, showing the location of a sensor that comprises a part of a preferred embodiment of the invention.
Figure 12:
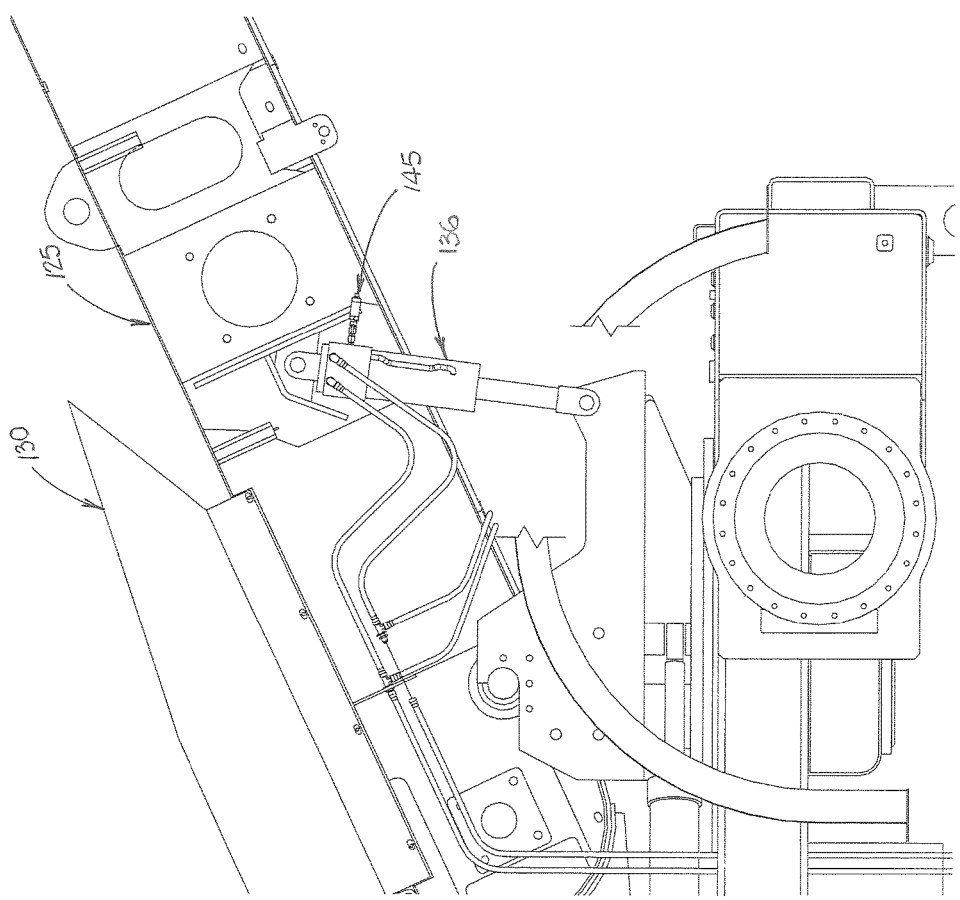
FIG. 12 is a side view of a portion of the paver-loading conveyor of the material transfer vehicle that is illustrated in FIGS. 7 and 8, showing the location of a sensor that comprises a part of a preferred embodiment of the invention.

A second embodiment of a material transfer vehicle is shown in FIGS. 7-13. As shown therein, material transfer vehicle 110 includes frame 112 that is supported on the roadway surface "S" by first wheel set 114 and second wheel set 116. Each of the wheel sets is driven by a hydraulic motor (not shown) that is supplied with fluid under pressure by one or more hydraulic pumps (one of which, hydraulic pump 117, is shown in FIG. 10). Vehicle 110 includes truck-receiving hopper 118 for receiving asphalt paving material from a conventional delivery truck (not shown). Material transfer vehicle 110 also includes operator's platform 120 from which all operating functions of the vehicle may be controlled. Operator's platform 120 includes controller 121 which is mounted in control panel 122.

When material transfer vehicle 110 is positioned adjacent an asphalt paving machine (such as paver 21 or paver 59) at a paving site, and is tethered in a conventional manner to a delivery truck for asphalt paving material, switches in control panel 122 are turned "on" to cause auger 123 (shown in FIG. 8), truck-unloading conveyor 124 and paver-loading conveyor 125 to operate. Auger 123 in truck-receiving hopper 118 will then urge asphalt paving material onto truck-unloading conveyor 124, which is operatively attached to the truck-receiving hopper and is adapted to convey asphalt paving material from truck-receiving hopper 118 upwardly to its elevated output end 126, from which it will fall into chute 130 on lower input end 132 of paver-loading conveyor 125. Paver-loading conveyor 125 is mounted for pivotal movement about a horizontal pivot axis at lower input end 132 by means of one or more linear actuators including actuator 136 so that the output end 138 of paver-loading conveyor 125 may be raised and lowered. Conveyor 125 is also adapted for side-to-side movement about a vertical axis by operation of one or more additional actuators (not shown).

The switches for auger 123, truck-unloading conveyor 124 and paver-loading conveyor 125 on control panel 122 are tied together so that these components of the conveyor system of material transfer vehicle 110 are activated at the same time, in order that asphalt paving material that falls into chute 130 on paver-loading conveyor 125 will be carried upwardly to output end 138 of paver-loading conveyor 125, from which it will fall into the hopper of an asphalt paving machine (not shown in FIGS. 7-13). Material transfer vehicle 110 includes various hydraulic pumps (including pump 117) and hydraulic motors, which are in fluid communication as part of a hydraulic circuit, and are provided to drive transverse auger 123 and the various conveyors. Engine 140 (shown in FIG. 9) is housed in engine housing 141 to provide the motive force for the hydraulic pumps that drive the hydraulic motors for the wheel sets, the transverse auger and the various conveyors and other components of material transfer vehicle 110.

Controller 121 may embody a single microprocessor or multiple microprocessors that include components for controlling operations of material transfer vehicle 110 based on input from an operator of the material transfer vehicle and on sensed or other known operational parameters. Controller 121 may include or be associated with a memory component, a data input component such as a touch screen and/or a keyboard, a secondary storage device, a processor and other components for running an application. Various other circuits may be associated with controller 121 such as power supply circuitry, signal conditioning circuitry and other types of circuitry. Numerous commercially available microprocessors can be configured to perform the functions of controller 121. It should be appreciated that controller 121 could readily be embodied in a general purpose computer or machine microprocessor capable of controlling numerous machine functions.

Controller 121 includes at least one timer and a memory component, and suitable software and software algorithms for calculating various loads, duty cycles, et c. In addition, controller 121 is operatively connected to one or more of various sensors that may be employed to indicate that a conveyor is operating under load, i.e., carrying asphalt paving material. Thus, controller 121 may be operatively connected to one or more of the following sensors: (a) a switch sensor that is a part of a conveyor operating switch (such as switch 32 of material transfer vehicle 20), which is adapted to determine if a conveyor (such as conveyor 124) is turned "on"; (b) an engine control module 142 of engine 140 (shown in FIG. 9) which is adapted to determine if the engine is operating at a load level above a predetermined load level; (c) an engine control module 142 which is adapted to measure the rate of consumption of fuel by the engine; (d) a pressure sensor such as sensor 143 that is located on hydraulic pump 117 (shown in FIG. 10) which is adapted to determine if the hydraulic pressure in the hydraulic circuit associated with a conveyor is above a predetermined load level; (e) a non-contact sensor such as ultrasonic sensor 144 (located near output end 126 of conveyor 124) which is adapted to detect the presence of asphalt paving material falling off output end 126 of the conveyor; (f) a load cell (not shown in connection with vehicle 110, but similar to shear style load cells 44 that are mounted between conveyor frame side mounts 45 (shown in FIG. 3) of truck-unloading conveyor 26 and pivot mounts 31 which are attached to the frame of material transfer vehicle 20), which is adapted to detect the weight of asphalt paving material on the truck-unloading conveyor (or to detect the weight of material in surge bin 34 of material transfer vehicle 20); and (g) a load sensor such as load sensor 145 (shown in FIG. 12) which is adapted to determine if the pressure in an actuator supporting a conveyor comprising a hydraulic cylinder (such as in hydraulic cylinder 136 supporting paver-loading conveyor 125) is above a predetermined load level. One or any combination of such sensors may be operatively connected to controller 121 to allow the timer component of the controller (which may include multiple timers) to measure the time that a conveyor is operating under load, i.e., carrying asphalt paving material. Preferably, the controller is operatively connected to at least two such sensors to provide for more accurate readings of a conveyor operating load condition.

Figure 13:
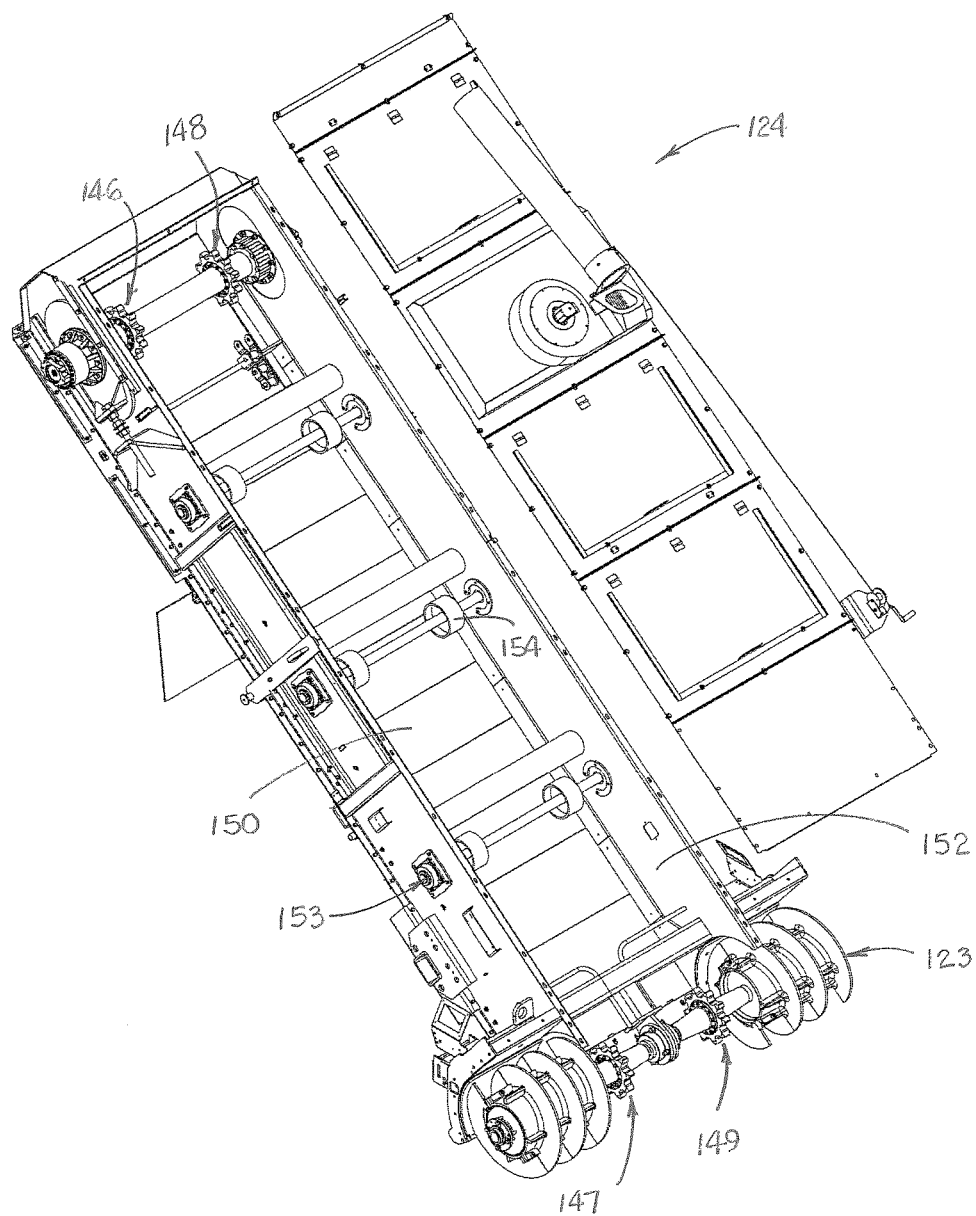
FIG. 13 is an exploded perspective view of the truck-unloading conveyor of the material transfer vehicle that is illustrated in FIGS. 7 and 8, showing the location of various wear parts the usage of which may be monitored according to a preferred embodiment of the invention.

Each such sensor is adapted to send a signal to controller 121 when the sensor determines that a condition exists which is indicative of a conveyor operating under a load, and the timer component of controller 121 will measure the time that the conveyor is operating under load. The controller is also adapted to receive input information, such as a predetermined operating run-time limit for a particular wear part or component of a conveyor such as conveyor 124. Thus, as shown in FIG. 13, such wear parts may include a conveyor chain (not shown, but attached between upper sprocket 146 and lower sprocket 147 or between upper sprocket 148 and lower sprocket 149), a conveyor slat such as any of slats 28 (shown in FIG. 1), a conveyor floor liner such as floor liner 150 (shown in FIG. 13), a conveyor side liner such as side liner 152, a sprocket such as sprocket 146, a bearing such as bearing 153, an idler such as idler 154, and an auger that is associated with a conveyor (such as auger 123). The controller is adapted to store this input run-time information for each of a plurality of wear parts in its memory component, and to compare the measured operating time that the conveyor is operating under load with the predetermined operating run-time limits for the various wear parts, and if the measured operating time reaches any of the predetermined run-time limits, the controller will signal the operator that the particular wear part for which the limit has been reached should be inspected for possible replacement or replaced.

Examples of the run-time input information that may be stored in the memory component of a controller for the various wear parts of a working machine conveyor system are shown in the following chart:

| Working Machine | Conveyor Wear Part | Conveyor Run Time Under Load | |
|---|---|---|---|
| | | Inspect (Hours) | Replace (Hours) |
| Milling Machine | Conveyor Belt | 1500 | 2000 |
| | Wear Liners (flashing) | 1000 | 1500 |
| | Pulleys | 1000 | 1500 |
| | Idlers | 1000 | 1500 |
| Cold Recycler Machine | Conveyor Belt | 1500 | 2000 |
| | Wear Liners (flashing) | 1000 | 1500 |
| | Pulleys | 1000 | 1500 |
| | Idlers | 1000 | 1500 |
| Material Transfer Vehicle | Conveyor Slats | 1000 | 3000 |
| | Floor Liners | 1000 | 5000 |
| | Side Liners | 1000 | 5000 |
| | Chains | 1000 | 3000 |
| | Bearings | 1000 | 5000 |
| | Sprockets | 500 | 1000 |
| | Idlers | 1000 | 5000 |
| | Augers | 1000 | 2000 |
| Paving Machine | Conveyor Slats | 1000 | 2000 |
| | Floor Liners | 1000 | 2000 |
| | Side Liners | 1000 | 2000 |
| | Chains | 1000 | 2000 |
| | Bearings | 500 | 2000 |
| | Sprockets | 500 | 2000 |
| | Augers | 500 | 1000 |

Controller 121 may also be adapted to transmit measured time data (wirelessly or by periodic wired connection) to remote servers or cloud servers for further processing, decision-making and displaying of the data, and/or to a general purpose computer that is operated by the owner of the working machine or a provider of wear parts for the working machine. Such general purpose computer may be programmed with information about the expected operating life of various wear parts on the conveyors, including conveyor belting, chains and slats, conveyor floor liners and side liners, sprockets, idlers, bearings, and augers. The controller may also be programmed to transmit a message such as an e-mail or other signal to the machine owner when any conveyor has operated under load for a time that would suggest that one or more wear parts should be inspected for replacement or replaced. The controller may also be programmed to include in any such transmission the part number for any such wear part and sufficient information to permit the owner to place an order for the specified wear part or parts.

Although this description contains many specifics, these should not be construed as limiting the scope of the invention but as merely providing illustrations of the presently preferred embodiment thereof, as well as the best mode contemplated by the inventor of carrying out the invention. The invention, as described and claimed herein, is susceptible to various modifications and adaptations, as would be understood by those having ordinary skill in the art to which the invention relates.

What is claimed is:

1. A working machine for conducting a roadworking operation, said machine comprising:
   (a) a conveyor that is adapted to move roadworking material as a part of a roadworking operation;
   (b) a sensor which is adapted to determine if a condition exists that is indicative of the conveyor's operating under a load;
   (c) a controller which:
      (i) is adapted to receive input information including a predetermined operating run-time for a wear part that is associated with the conveyor;
      (ii) is adapted to receive a signal from the sensor that a condition exists which is indicative of the conveyor's operating under load;
      (iii) includes a timer that is adapted to use the signal received from the sensor to measure a period of time during which the conveyor is operating under load;
      (iv) is adapted to compare the measured period of time that the conveyor is operating under load with the predetermined operating run-time for the wear part, and if the measured time matches the predetermined operating run-time, to signal the operator that the wear part should be inspected for possible replacement, or replaced.

2. The working machine of claim 1, wherein:
   (a) the working machine includes an engine;
   (b) the working machine includes a hydraulic circuit which is associated with the operation of the conveyor;
   (c) the conveyor includes an output end, off of which roadworking material will fall when the conveyor is operating;
   (d) the conveyor includes a linear actuator that supports at least a portion of the conveyor on the working machine;
   (e) the sensor is selected from the group consisting of:
      (i) a switch sensor which is adapted to determine if the conveyor is turned on;
      (ii) an engine control module which is adapted to determine if the engine is operating at a load level above a predetermined load level;
      (iii) an engine control module which is adapted to measure the rate of consumption of fuel by the engine;
      (iv) a pressure sensor which is adapted to determine if the hydraulic pressure in the hydraulic circuit associated with the conveyor is above a predetermined load level;
      (v) a non-contact sensor which is adapted to detect the presence of roadworking material falling off the output end of the conveyor;
      (vi) a load cell which is adapted to detect the weight of roadworking material on the conveyor; and
      (vii) a load sensor which is adapted to determine if the pressure in the linear actuator supporting the conveyor is above a predetermined load level.

3. The working machine of claim 1 wherein:
   (a) the working machine includes an engine;
   (b) the working machine includes a hydraulic circuit which is associated with the operation of the conveyor;
   (c) the conveyor includes an output end, off of which roadworking material will fall when the conveyor is operating;
   (d) the conveyor includes a linear actuator that supports at least a portion of the conveyor on the working machine;
   (e) the working machine includes at least two sensors, each of which:
      (i) is adapted to determine if a condition exists that is indicative of the conveyor's operating under a load;
      (ii) is operatively attached to the controller;
      (iii) is adapted to send a signal to the controller that a condition exists which is indicative of the conveyor's operating under load.

4. The working machine of claim 3, wherein each sensor is selected from the group consisting of:
   (a) a switch sensor which is adapted to determine if the conveyor is turned on;
   (b) an engine control module which is adapted to determine if the engine is operating at a load level above a predetermined load level;
   (c) an engine control module which is adapted to measure the rate of consumption of fuel by the engine;
   (d) a pressure sensor which is adapted to determine if the hydraulic pressure in the hydraulic circuit associated with the conveyor is above a predetermined load level;
   (e) a non-contact sensor which is adapted to detect the presence of roadworking material falling off the output end of the conveyor;
   (f) a load cell which is adapted to detect the weight of roadworking material on the conveyor; and
   (j) a load sensor which is adapted to determine if the pressure in the actuator supporting the conveyor is above a predetermined load level.

5. The working machine of claim 4 wherein each sensor is of a type that is different from each of the other sensors.

6. The working machine of claim 1, wherein the wear part that is associated with the conveyor is selected from the group consisting of:
   (a) a conveyor chain;
   (b) a conveyor slat;
   (c) a conveyor floor liner;
   (d) a conveyor side liner;
   (e) a conveyor belt;
   (f) a sprocket;
   (g) an idler;
   (h) a bearing; and
   (i) an auger.

7. The working machine of claim 1, wherein the controller is adapted to:
   (a) receive input information including a predetermined operating run-time for each of a plurality of wear parts that are associated with the conveyor, with each such wear part being selected from the group consisting of:
(i) a conveyor chain;
(ii) a conveyor slat;
(iii) a conveyor floor liner;
(iv) a conveyor side liner;
(v) a conveyor belt;
(vi) a sprocket;
(vii) an idler;
(viii) a bearing; and
(ix) an auger;
(b) compare the measured period of time that the conveyor is operating under load with the predetermined operating run-time for each of the plurality of wear parts, and if the measured time matches the predetermined operating run-time for one of the wear parts, signal the operator that the wear part should be inspected for possible replacement, or replaced.

8. The working machine of claim 1, wherein the controller is adapted to transmit measured time data to a remote server.

9. The working machine of claim 1, wherein the controller is adapted to transmit a message to the owner of the working machine when the conveyor has operated under load for a time that would suggest that a wear part should be inspected for replacement or should be replaced.

10. The working machine of claim 9 wherein the controller is adapted to include in the transmission to the owner a part number for the wear part.

11. The working machine of claim 10 wherein the controller is adapted to include in the transmission to the owner sufficient information to permit the owner to place an order for the wear part.

* * * * *